US010875509B2

(12) United States Patent
Werner (10) Patent No.: US 10,875,509 B2
(45) Date of Patent: Dec. 29, 2020

(54) VEHICLE WITH STARTER AID

(71) Applicant: KNORR-BREMSE Systeme fuer Nutzfahrzeuge GmbH, Munich (DE)

(72) Inventor: Frank Werner, Ditzingen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 168 days.

(21) Appl. No.: 16/249,977

(22) Filed: Jan. 17, 2019

(65) Prior Publication Data

US 2019/0143949 A1     May 16, 2019

Related U.S. Application Data

(63) Continuation of application No. PCT/EP2017/067716, filed on Jul. 13, 2017.

(30) Foreign Application Priority Data

Jul. 19, 2016    (DE) .................. 10 2016 113 249

(51) Int. Cl.
     *B60T 8/175*      (2006.01)
     *B60T 7/12*        (2006.01)
     (Continued)

(52) U.S. Cl.
     CPC .............. *B60T 8/175* (2013.01); *B60T 7/04* (2013.01); *B60T 7/08* (2013.01); *B60T 7/12* (2013.01);
     (Continued)

(58) Field of Classification Search
     CPC .......... B60T 8/175; B60T 8/1761; B60T 7/04; B60T 7/08; B60T 7/12; B60T 7/122;
     (Continued)

(56) References Cited

U.S. PATENT DOCUMENTS

| 5,472,264 A | 12/1995 | Klein et al. |
| 5,612,879 A * | 3/1997 | Makino .................. B60T 8/175 303/168 |

(Continued)

FOREIGN PATENT DOCUMENTS

| CN | 1517254 A | 8/2004 |
| CN | 103496360 A | 1/2014 |

(Continued)

OTHER PUBLICATIONS

International Preliminary Report on Patentability (PCT/IB/326 & PCT/IB/373) issued in PCT Application No. PCT/EP2017/067716 dated Jan. 31, 2019, including English translation of (German-language Written Opinion (PCT/ISA/237) previously filed on Jan. 17, 2019) (six (6) pages).

(Continued)

*Primary Examiner* — Aaron L Troost
(74) *Attorney, Agent, or Firm* — Crowell & Moring LLP (57) ABSTRACT

A vehicle starter aid system is provided for a vehicle having at least one driven axle and at least one non-driven axle. An electrically controllable brake system generates brake application signals as a function of input signals for the wheel brake actuators on the at least one driven axle. The inputs signals are received from a rotational speed sensor of the at least one non-driven axle and at least one signal-generator which generates signals which represent intended driving away of the vehicle from the stationary state and are different from the wheel rotational speed signals. An electronic brake control unit controls application of the wheel brake actuators of the at least one driven axle if the rotational speed signals of the rotational speed sensor correspond to zero wheel rotational speed and at the same time the signals of the signal-generator indicate the intended driving away of the vehicle.

11 Claims, 1 Drawing Sheet

(51) Int. Cl.
  *B60T 7/04* (2006.01)
  *B60T 7/08* (2006.01)
  *B60T 8/1761* (2006.01)

(52) U.S. Cl.
  CPC ............ *B60T 7/122* (2013.01); *B60T 8/1761* (2013.01); *B60T 2201/06* (2013.01); *B60T 2220/04* (2013.01); *B60T 2270/10* (2013.01); *B60T 2270/20* (2013.01); *B60T 2270/30* (2013.01)

(58) Field of Classification Search
  CPC ............ B60T 2201/06; B60T 2270/10; B60T 2270/20; B60T 2270/30
  See application file for complete search history.

(56) References Cited

U.S. PATENT DOCUMENTS

| | | | |
|---|---|---|---|
| 6,687,644 | B1 | 2/2004 | Zinke et al. |
| 2004/0133329 | A1 | 7/2004 | Lee |
| 2008/0204214 | A1 | 8/2008 | Reith et al. |
| 2013/0204504 | A1* | 8/2013 | Bieniek .................. B60T 8/175 701/82 |
| 2016/0023660 | A1 | 1/2016 | Yu |
| 2016/0236662 | A1 | 8/2016 | Neu et al. |

FOREIGN PATENT DOCUMENTS

| | | |
|---|---|---|
| CN | 103661333 A | 3/2014 |
| DE | 28 18 813 A1 | 11/1979 |
| DE | 196 50 935 A1 | 6/1998 |
| DE | 199 17 437 A1 | 10/2000 |
| DE | 10 2005 023 246 A1 | 11/2006 |
| DE | 10 2005 023 247 A1 | 11/2006 |
| DE | 10 2010 039 174 A1 | 2/2012 |
| DE | 10 2013 000 276 A1 | 7/2014 |
| EP | 2 755 039 B1 | 10/2010 |
| EP | 2 755 039 A1 | 7/2014 |
| GB | 2 167 507 A | 5/1986 |
| KR | 10 2016 0070177 A | 6/2016 |
| WO | WO 2006/122623 A1 | 11/2006 |

OTHER PUBLICATIONS

International Search Report (PCT/ISA/210) issued in PCT Application No. PCT/EP2017/067716 dated Sep. 25, 2017 with English translation (six (6) pages).
Language Written Opinion (PCT/ISA/237) issued in PCT Application No. PCT/EP2017/067716 dated Sep. 25, 2017 (five (5) pages).
German-language Office Action issued in counterpart German Application No. 10 2016 113 249.7 dated Mar. 22, 2017 (five (5) pages).
Hindi-language Office Action issued in Indian Application No. 201937001691 dated Jul. 22, 2020 with English translation (five (5) pages).
Chinese-language Office Action issued in Chinese Application No. 201780044646.1 dated Aug. 25, 2020 with English translation (eight (8) pages).

\* cited by examiner

VEHICLE WITH STARTER AID

CROSS REFERENCE TO RELATED APPLICATIONS

This application is a continuation of PCT International Application No. PCT/EP2017/067716, filed Jul. 13, 2017, which claims priority under 35 U.S.C. § 119 from German Patent Application No. 10 2016 113 249.7, filed Jul. 19, 2016, the entire disclosures of which are herein expressly incorporated by reference.

BACKGROUND AND SUMMARY OF THE INVENTION

The invention is based on a vehicle having at least one driven axle and at least one nondriven axle, wherein wheel brake actuators are respectively provided on the at least one driven axle and on the at least one nondriven axle, having an electrically controllable brake system which includes at least one electronic brake control unit which is designed to generate brake application signals in dependence on input signals only for the wheel brake actuators on the at least one driven axle, for the at least partial application of the wheel brake actuators only on the at least one driven axle, in accordance with the preamble of claim 1.

It is in principle the case in vehicles that the force transmission responsible for the locomotion of the vehicle is dependent on the traction slip between tires and roadway. In general, the starting or acceleration processes proceed at small slip values at which an increase in the slip initially also results in an increase in the utilizable adhesion. However, with a further increase, the adhesion is reduced again, with the result that, with corresponding acceleration, an increasing excessive drive torque leads to a rapid rotational speed increase of a driven wheel or of the driven wheels.

A control of the traction slip, that is to say a so-called traction slip control (ASR), prevents a spinning of the driven wheels caused in such a way and controls the traction slip to admissible values. Such traction slip controls are known from the prior art, for example from "Kraftfahrtechnisches Taschenbuch" ["Pocketbook of Motor Vehicle Technology"], publisher: Robert Bosch GmbH, Düsseldorf, 21st edition, 1991, pages 555-559. The control of the traction slip is carried out in the prior art in such a way that, upon reaching a limit value of the traction slip or a change with respect to time (derivation with respect to time) of the traction slip, the drive torque is reduced. The reduction of the drive torque is realized either by diminishing the drive torque (in internal combustion engines by adjusting the throttle valve or the ignition time) and/or by actuating one or more wheel brake(s) on the driven axle(s). In particular, in addition to diminishing the drive torque, which occurs when exceeding a first limit value of the traction slip, the wheel brakes on the driven axle(s) can be automatically actuated if a second, higher limit value of the traction slip is reached.

So-called passive sensors are customarily used as wheel rotational speed sensors for traction slip control (ASRs). Passive sensors are more cost-effective and less temperature-sensitive than active sensors. Active sensors refer to those sensors which require a supply voltage and contain temperature-sensitive semiconductors. However, the passive rotational speed sensors do not make possible a reliable detection of low speeds or rotational speeds and the direction of rotation of the wheels of a driven axle.

For example, it can occur in vehicles having ABS (antilocking system, brake slip control) or EBS (electronic brake system) with/or without ESP or EPB (electronic parking brake) and having automatic transmissions or automated transmissions that, with said vehicles situated or parked on a slippery ice surface, they can no longer start because the wheels of the driven axle spin if the drive torque is too large, this being caused by the effect of "sinking-in of the drive wheels" in which heated tires form a water film under the tires that freezes again, however. Since such vehicles no longer have a clutch pedal, however, the driver can no longer have any influence on the drive torque via the clutch. A possibly present traction slip control (ASR) can often not become active in such situations since the wheel speeds then usually lie below the detection speed threshold (about 3 to 10 km/h) of passive wheel rotational speed sensors. Nor does the insertion of a differential lock provide further help if the two wheels of the driven axle(s) are situated on slippery ground. If the driver opens up the throttle further and increases the speed beyond the detection speed threshold, with the result that ASR becomes active, the drive torque cannot be sufficiently reduced, however, since the wheel speeds must be kept above the detection speed threshold of the passive wheel rotational speed sensors. The known ASR (traction slip control by engine torque reduction and/or brake engagement on the driven axle(s)) therefore takes effect only at wheel speeds of greater than about 3 to 10 km/h.

Therefore, in order to realize the functions of a traction slip control in such a situation, use would have to be made, instead of the cost-effective passive wheel rotational speed sensors, of active wheel rotational speed sensors on the wheels of the driven axle.

By contrast, the object on which the present invention is based is to develop a vehicle of the type mentioned at the outset in such a way that it prevents an excessive traction slip when starting from the stationary state in a cost-effective manner.

The invention is based on a vehicle having
at least one driven axle and at least one nondriven axle, wherein wheel brake actuators are respectively provided on the at least one driven axle and on the at least one nondriven axle,
an electrically controllable brake system which includes at least one electronic brake control unit which is designed to generate brake application signals in dependence on input signals only for the wheel brake actuators on the at least one driven axle, for the at least partial application of the wheel brake actuators only on the at least one driven axle.

Such an electrically controllable brake system which allows only axle-by-axle braking is for example an EBS (electronically controlled brake system) in particular of heavy commercial vehicles, which then particularly also has ABS (brake slip control), ASR (traction slip control) and ESP (electronic driving stability program) functionalities. Each of the stated functionalities (ABS, ASR, ESP) is capable of individually braking individual axles and, here in particular, driven axles. Furthermore, however, an electrically controlled parking brake (EPB) also makes it possible to individually brake individual axles and, here in particular, driven axles, in particular a rear axle on whose wheel brakes the parking brake generally acts.

The invention is then characterized by
provision of a passive or active rotational speed sensor, with a measuring range covering an entire rotational speed range from zero to a maximum rotational speed, on at least one wheel of the at least one nondriven axle, wherein the rotational speed sensor feeds rotational speed signals into the electronic brake control unit as input signals, signal-generating means which generate signals which differ from wheel rotational speed signals generated by a wheel rotational speed sensor and which represent an intended driving away of the vehicle from the stationary state and are fed as input signals into the electronic brake control unit, wherein the electronic brake control unit is designed in such a way that it at least temporarily feeds brake application signals into the wheel brake actuators of the at least one driven axle if the rotational speed signals of at least one rotational speed sensor, wherein the sensor can be designed to be passive or active, on at least one nondriven axle correspond to a rotational speed equal to zero and at the same time the signals of the signal-generating means indicate an intended driving away of the vehicle from the stationary state, and in such a way that it no longer feeds brake application signals into the wheel brake actuators of the at least one driven axle if the rotational speed signals of the rotational speed sensors at least on a nondriven axle correspond to a rotational speed which is unequal to zero.

In other words, the wheel rotation sensors, which can then still be configured as passive wheel rotational speed sensors and thus in a cost-effective and robust manner, do not generate the signals which represent or signal an intended driving away of the vehicle from the stationary state, but rather signal-generating means which differ in relation to wheel rotational speed sensors, such as, for example, an often in any case already present active rotational speed sensor which measures the rotational speed of the transmission output shaft of the transmission and feeds it as input signals into the electronic brake control unit. If it is determined for example by the electronic brake control unit that the instantaneous rotational speed of the transmission output shaft of the transmission is greater than 0, this indicates an intended driving away of the vehicle from the stationary state.

Alternatively or in addition, the signal-generating means can also generate the signals which represent an intended driving away of the vehicle from the stationary state in dependence on an actuation of a hand- and/or foot-actuatable actuating member that is carried out by the driver of the vehicle. Such an actuating member is then encompassed by the signal-generating means.

In particular, the signals of the signal-generating means which represent an intended driving away of the vehicle from the stationary state can be at least dependent on an engaged or disengaged state of a clutch of the vehicle and/or dependent on a selected transmission gear stage or on a selected transmission mode and/or dependent on an actuation or nonactuation of a brake pedal and/or dependent on an actuation or nonactuation of a gas pedal and/or dependent on an actuation or nonactuation of a parking brake. Therefore, where present, the clutch pedal, the gas pedal, the brake pedal, the shift lever or the selector lever of the automatic transmission, or the actuating member (lever, rocker switch, button, etc.) of the parking brake, then constitute the actuating member of the signal-generating means. Here, the signals can originate directly from a sensor which registers actuation of these actuating members or else can also be indirectly derived from another variable.

For example, an actuated gas pedal, a selector lever of an automatic transmission that is situated in a driving position (Drive or Reverse), an unactuated brake pedal and, if a driver-actuatable clutch is present, an unactuated clutch pedal indicate an intended driving away of the vehicle from the stationary state. Since an actuation of these actuating members is directly or else indirectly detected by an in any case present sensor system and corresponding signals are in any case present for example on a data bus of the vehicle, no additional sensors have to be provided in order to be able to establish an intended driving away of the vehicle from the stationary state. According to a first aspect, the detection of the intended driving away of the vehicle from the stationary state occurs automatically by an already present or still-to-be-provided sensor system.

Alternatively or in addition, however, the signal-generating means can also comprise an additional actuating member which can be separately actuated by the driver and be designed in such a way that, independently of an actuation of a clutch, a transmission, a brake pedal, a gas pedal and a parking brake of the vehicle, they generate the signals which differ from wheel rotational speed signals generated by a wheel rotational speed sensor and which represent an intended driving away of the vehicle from the stationary state and are fed as input signals into the electronic brake control unit. Such an additional actuating member which can be actuated separately by the driver can consist for example in a button or switch which is integrated into a current circuit and which is actuated by the driver if he or she has determined that a driving away from the stationary state on slippery ground is not possible without excessive traction slip. After actuating this actuating member, the electrical input signals for the electronic brake control unit which represent or indicate an intended driving away of the vehicle from the stationary state are then generated.

An additional actuating member which can be actuated separately by the driver is not to be understood as meaning an actuating member which differs from the further actuating members which can be actuated by the driver and by which said driver can influence the state of movement of the vehicle, such as, for example, gas pedal, clutch pedal, brake pedal or actuating member of the parking brake.

If then the signals, which are described above by way of example, of the signal-generating means as input signals for the electronic brake control unit indicate a starting of the vehicle from the stationary state, whether forward or backward, the electronic brake control unit is designed in such a way that it at least temporarily feeds brake application signals into the wheel brake actuators of the at least one driven axle if the rotational speed signals of at least one rotational speed sensor on the front axle correspond to a rotational speed equal to zero and at the same time the signals of the signal-generating means indicate an intended driving away of the vehicle from the stationary state.

If therefore at least one wheel rotational speed sensor on the at least one nondriven axle communicates a rotational speed substantially equal to zero to the electronic brake control unit, but on the other hand the signals of the signal-generating means signal a driving away of the vehicle from the stationary state, the wheels of the at least one driven axle must spin on the ground. The electronic brake control unit then at least temporarily feeds brake application signals into the wheel brake actuators of the at least one driven axle. Here, braking forces or brake torques of any desired magnitude, time duration and in any desired functional relationship with time are possible. A person skilled in the art specifies in advance braking forces or brake torques for example as a function of vehicle parameters. Also conceivable, however, is a matching of the braking forces or brake torques as a function of the signals of the signal-generating means. If, for example, it is determined that the gas pedal has been actuated to a relatively high degree but the wheel rotational speed sensors on the at least one nondriven axle still deliver the value zero, a relatively large brake torque is also necessary than if, for instance, the gas pedal has been actuated to a relatively low degree. In the progression with respect to time of the brake torque or of the braking forces, i.e. the dependency thereof on time starting from the effectiveness of the brake application signals, any desired dependency is possible, in particular a ramp-form increase of the braking force or an abrupt descent and also an intermittent effectiveness of the generation of braking forces in a similar manner to an ABS.

If then, as reaction to the braking forces acting on the wheels of the at least one driven axle, these wheels then no longer spin or no longer exceed a permitted degree of traction slip, this being determined by the fact that the rotational speed signals of the at least one rotational speed sensor on at least one nondriven axle then simply correspond to a rotational speed which is unequal to zero (forward travel or reverse travel), the electronic brake control unit no longer feeds brake application signals into the wheel brake actuators of the at least one driven axle. The vehicle has then successfully assumed the driving state.

If therefore, in a situation during starting with spinning wheels, the driven wheels are braked by an electronic or electrical brake system, for example EBS with ABS and/or ASR and/or EPB, which allows in principle axle-by-axle braking, the drive torque can be reduced to such an extent that the driven wheels can build up grip again and a driving away becomes possible. As a result, the driver obtains a starter aid which allows him or her to reduce the drive torque transmitted to the driven wheels with respect to the setpoint drive torque. This starting aid acts in particular even below the detection threshold of passive wheel rotational speed sensors because the brake application forces are maintained until at least one rotational speed sensor on the at least one nondriven axle detects the still present stationary state of the vehicle or the driving state of the vehicle. This starter aid can be realized with different, already widespread electrically controlled brake systems which include, for example, ABS, ASR, ESP or an EPB (electrically controlled parking brake). In particular, a vehicle which is equipped only with an electrically controlled parking brake EPB also allows such a starter aid without an ABS, ASR or ESP additionally having to be present on the service brake side.

The driver recognizes the need for the starter aid in that, with the gear engaged, he or she opens the throttle and the wheels on the driven axle spin and no traction takes place. Said driver can then for instance actuate a separate switch, lever or button as actuating member which then feeds an input signal into the electronic brake control unit, wherein this then generates a braking force on the wheel brakes of the at least one driven axle. Here, an ASR or ABS functionality implemented in the electronic brake control unit allows, for example, a slow increase of the braking forces, in electro-pneumatic brakes of the braking pressure in the pneumatic wheel brake cylinders of the at least one driven axle first to the application pressure (for example 0.3 bar) and then a slow, ramplike increase (for example 0.2 bar/s) up to a predetermined value. Also conceivable, however, is an abrupt increase from zero to a parameterized value.

If the driver then moves the switch or button into the OFF position again or a parameterized time limit has expired or a certain parameterized braking pressure has been reached, the starter aid is stopped and the braking force is reduced to zero again. The corresponding parameters must be determined by tests.

If an electrically controlled parking brake EPB equipped with spring-loaded brake cylinders and intended for braking the driven wheels is used, the EPB reduces the pressure in the spring-loaded brake cylinders in a ramplike manner for example, or up to a time limit, or until a defined pressure value is reached in the spring-loaded brake cylinders. The parameters must also be determined by tests. Here, the driver can automatically maintain the gas pedal position or raise or lower it or the gas pedal position is frozen and the engine torque automatically kept constant.

However, the detection of the situation of spinning driven wheels with the vehicle otherwise being stationary can also occur automatically using various sensor signals, as has already been described comprehensively above. If, for example, the rotational speed of the transmission output shaft, the engaged gear, the clutch signal and the rotational speed of the nondriven wheels, for example on the front axle, are known by rotational speed sensors, the situation can be automatically detected. The driven wheels spin slowly, which is detected by the rotational speed of the transmission output shaft, by the clutch signal with the clutch engaged or closed, and the engaged gear is detected by the gear information. It is also detected by means of signals of the electrically controlled parking brake that the latter is released, by means of the gas pedal position and the brake pedal position that the driver opens the throttle, the brake is released and the driver intends to drive away. However, since the vehicle with spinning driven wheels does not move, the wheel rotational speed signals of the rotational speed sensors, for example on the front axle, do not indicate any speed. Then, as described above, the braking force is applied to the driven wheels automatically and as a result the effective driving engine torque is reduced until the driven wheels obtain grip again. If wheel speeds on the front axle are then detected by the rotational speed sensors to be unequal to zero, the braking force on the driven wheels is switched off again. If the vehicle remains stationary once again and the driven wheels spin once again, the procedure starts afresh.

The electronic brake control unit in which the starter aid triggered by the driver or automatically is implemented can be designed as a separate control unit or be integrated into a further control unit which otherwise performs a function which differs from a braking function.

With particular preference, the signals of the signal-generating means are dependent on the rotational speed of a transmission output shaft of a transmission of the vehicle. Here, the signal-generating means can comprise at least one active rotational speed sensor which measures the rotational speed of the transmission output shaft of the transmission and feeds it as input signals into the electronic brake control unit. Since such an active rotational speed sensor is often already present on the transmission output shaft of the transmission, additional sensors for realizing the starter aid can be dispensed with.

Alternatively or in addition, the signal-generating means can generate the signals which differ from wheel rotational speed signals generated by a wheel rotational speed sensor and which represent an intended driving away of the vehicle from the stationary state in dependence on an actuation of a hand- and/or foot-actuatable actuating member that is carried out by a driver of the vehicle. Here, the signals of the signal-generating means can be at least dependent on an engaged or disengaged state of a clutch of the vehicle and/or dependent on a selected transmission gear stage or on a selected transmission mode and/or dependent on an actuation or nonactuation of a brake pedal and/or dependent on an actuation or nonactuation of a gas pedal and/or dependent on an actuation or nonactuation of a parking brake. These signals are also usually already present, for example on a data bus of the vehicle.

The aforementioned statements therefore relate to an automatic detection of a starting situation. Alternatively or in addition, the driver can also activate the starter aid himself.

Alternatively or in addition, the signal-generating means can therefore comprise an additional actuating member which can be actuated separately by the driver and be designed in such a way that, independently of an actuation of a clutch, a transmission, a brake pedal, a gas pedal or a parking brake of the vehicle, they generate the signals which differ from wheel rotational speed signals generated by a wheel rotational speed sensor and which represent an intended driving away of the vehicle from the stationary state and are fed as input signals into the electronic brake control unit. Since the driver then actuates the actuating member, the above-described starting aid is activated. Here, the actuating member can be designed in such a way that the starter aid is active until such time as the actuator member is actuated. Alternatively, however, each actuation of the actuating member can cause a switching from "active" to "nonactive", and vice versa, or an "active" or "on" position of the actuating member and a "nonactive" or "off" position of the actuating member can already also be provided.

The brake application signals provided into the electrically controllable brake actuators of the at least one driven axle for the at least temporary application of the brake actuators on the at least one driven axle can preferably be designed in such a way that they generate an at least temporarily acting brake torque on the wheels of the at least one driven axle. Here, the at least temporarily acting brake torque on the wheels of the at least one driven axle can increase starting from zero in ramp form or linearly up to a predetermined value, abruptly assume a predetermined value or be active over one or more predetermined time intervals. Any desired progressions with respect to time of the braking force or of the brake torque are therefore achievable. The braking force or the brake torque can also be automatically adapted as a function of vehicle parameters, in particular on the basis of characteristic maps.

The electrically controllable brake system is preferably a service brake system, wherein the wheel brake actuators are then wheel brake actuators of the service brake, or else a parking brake system, wherein the wheel brake actuators are then wheel brake actuators of the parking brake.

With particular preference, the function of an ABS (brake slip control) and/or a traction slip control (ASR) and/or an electronic stability program (ESP) and/or an electronic parking brake (EPB) is implemented in the electronic brake control unit, because these functions allow in principle a separate axle-by-axle braking of driven axles and therefore no fundamental changes in the programming of the electronic brake control unit have to be made.

The electrically controllable brake system is preferably an electronically controlled, electropneumatic brake system (EBS) and the electronic brake control unit is preferably the electronic brake control unit of the electronically controlled electropneumatic brake system (EBS). This is also associated with the advantage that functions such as ABS, ASR and ESP are already integrated into such an electronically controlled electropneumatic brake system (EBS), by means of which functions driven axles can be braked separately and independently of nondriven axles.

Advantageous developments of the invention will emerge from the patent claims, the description and the drawings. The advantages of features and of combinations of a plurality of features that are stated in the introductory part of the description are merely by way of example and can act alternatively or cumulatively without the advantages necessarily having to be achieved by embodiments according to the invention.

Further features can be taken from the drawings, in particular the illustrated geometries and the relative dimensions of a plurality of components with respect to one another and their relative arrangement and operative connection. The combination of features of different embodiments of the invention or of features of different patent claims is likewise possible in ways other than according to the chosen back-references of the patent claims, and is hereby suggested. This also applies to those features that are illustrated in separate drawings or are mentioned in the description thereof. These features can also be combined with features of different patent claims. Similarly, for other embodiments of the invention, features presented in the patent claims may be omitted.

Identical or identically active components and subassemblies are each designated by the same reference numbers in different embodiments.

Other objects, advantages and novel features of the present invention will become apparent from the following detailed description of one or more preferred embodiments when considered in conjunction with the accompanying drawing.

DETAILED DESCRIPTION OF THE DRAWING

Figure 1:
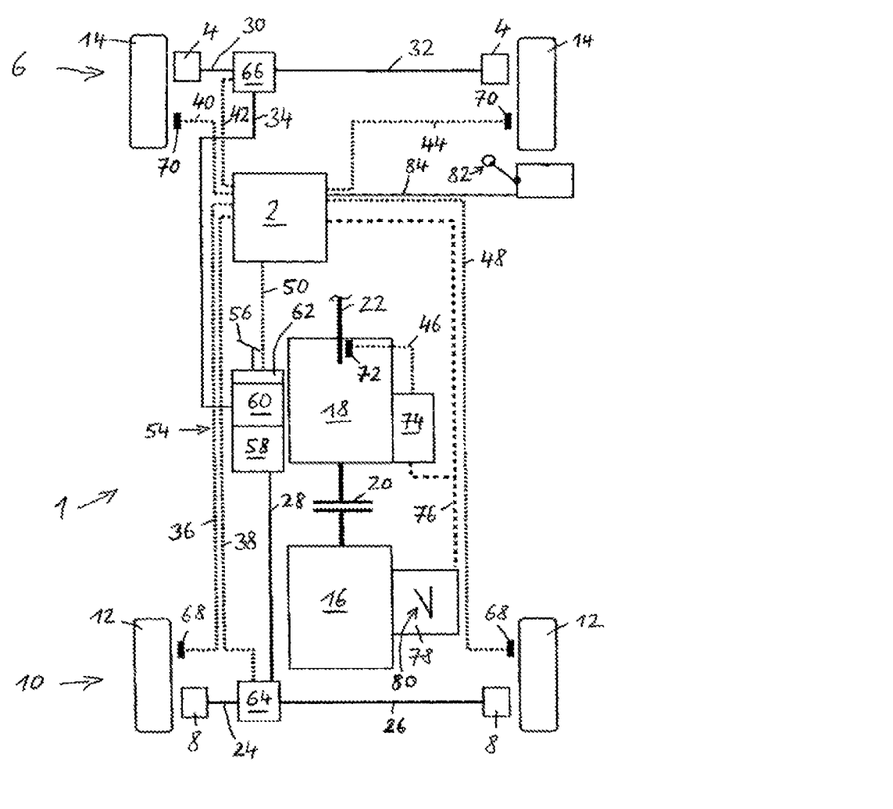
The FIGURE shows a schematic illustration of parts of a vehicle having an electropneumatic brake system according to an embodiment of the present invention.

An embodiment shown in the FIGURE of a vehicle 1, in particular a heavy commercial vehicle, has, for example, an electropneumatic, electronically controlled brake system EBS in which the brake forces are electronically controlled. The electronically controlled brake system EBS preferably has ABS, ASR and ESP functionalities and is therefore capable of separately braking, via its brake control unit 2, only wheel brakes 4 on a driven rear axle 6 without at the same time applying wheel brakes 8 on a nondriven front axle 10. However, in normal braking operation, the brake control unit 2 can apply in parallel the wheel brakes 4, 8 also on both axles 6, 10. Here, the wheel brakes 4, 8 include, for example, pneumatic brake cylinders which act on brake actuators such as disk brakes.

There is therefore present in the vehicle 1 the nondriven front axle 10 with two front wheels 12, the driven rear axle 6 with preferably two driven rear wheels 14, an engine 16, a transmission 18, a clutch 20 arranged between engine 16 and transmission 18, and a transmission output shaft 22 which here, for example, drives the wheels 14 of the rear axle 6 via a cardan shaft and a rear axle differential.

Also provided in the vehicle 1 are pneumatic lines 24, 26, 28, 30, 32, 34 of the electropneumatic, electronically controlled brake system EBS for conducting control pressures or braking pressures, and also data lines 36, 38, 40, 42, 44, 46, 48, 50 which are indicated by dashes and via which information and control commands are transmitted.

The pneumatic lines 28 and 34 and the data line 50 are connected to a brake value transmitter 54 with brake pedal 56 for the service brake of the electropneumatic, electronically controlled brake system EBS, wherein this brake value transmitter 54 here has two pneumatic channels, a pneumatic channel 58 for the control pressures of the front axle 10 and a pneumatic channel 60 for control pressures of the rear axle 6 and an electrical channel 62. The two pneumatic channels 58 and 60 are each supplied with compressed air by a dedicated compressed-air supply (not shown here) for the relevant axle.

Therefore, on the one hand, upon actuating the brake pedal 56 of the brake value transmitter 54, an electrical braking request signal is fed into the electronic brake control unit 2 via the data line 50. From there, a pressure-regulating module 64 for the wheel brakes 8 of the front axle 10 and a pressure-regulating module 66 for the rear brakes 4 of the rear axle 6 are electrically activated via the data lines 38, 42. In parallel to this, on the other hand, a corresponding control pressure passes into the pressure-regulating modules 64, 66 via the pneumatic lines 28 and 34 upon the actuation of the brake pedal 56, which control pressure, however, can become active there only when the electrical control via the electrical channel 62, the data lines 50, 38 and 42 and the electronic brake control unit 2 fails. The pressure-regulating modules 64, 66 each contain in a known manner an inlet-outlet solenoid valve combination which controls an integrated relay valve, a backup solenoid valve for retaining the pneumatic control pressure in the pressure lines 28 and 34 and a pressure sensor for each channel and are each connected to the relevant compressed-air supply for the front axle 10 or for the rear axle 6. Furthermore, the pressure-regulating modules 64 and 66 are here preferably each designed as 2-channel pressure-regulating modules, wherein in each case one channel regulates the braking pressure in a wheel brake 4, 8 on one vehicle side to the respectively desired setpoint braking pressure.

Therefore, the EBS here preferably has an electropneumatic front axle brake circuit and an electropneumatic rear axle brake circuit.

In dependence on the electrical braking request signals in the electrical channel 62 or in dependence on the pneumatic control pressures in the pneumatic channels 58, 60 of the brake value transmitter 54, the pressure-regulating modules 64, 66 then feed corresponding braking pressures into the wheel brakes 8 of the front axle via the pneumatic lines 24, 26 and into the wheel brakes 4 of the rear axle 6 via the pneumatic lines 30, 32.

The electronically controlled brake system EBS is preferably equipped with a brake slip control ABS. For this purpose and for further functions, such as, for example, ASR and ESP, the front wheels 12 and rear wheels 14 are each assigned wheel rotational speed sensors 68, 70. Therefore, upon braking, the actual wheel rotational speeds are communicated to the electronic brake control unit 2 by the data lines 36, 48 or 40, 44 and an actual brake slip is calculated there for each wheel. If this actual brake slip exceeds a predetermined setpoint brake slip, the brake control unit 2 preferably regulates the braking pressure channelwise via the pressure-regulating modules 64, 66 such that the setpoint brake slip on the relevant wheel 12, 14 is no longer exceeded.

The wheel rotational speed sensors 70 on the rear axle are preferably configured as passive wheel rotational speed sensors. On the one hand, they do not detect the direction of rotation of the wheels 14 on the rear axle 6. Nor is a speed detection at very low speeds possible. However, for the brake slip control (ABS) from average and high speeds, this is not necessary. In this respect, they are relatively cost-effective.

Passive or active wheel rotational speed sensors 68 can likewise be arranged on the wheels 12 of the nondriven front axle 10. These wheel rotational speed sensors 68 feed wheel rotational speed signals into the brake control unit 2 via the data lines 36, 48. If active wheel rotational speed sensors 68 are used, they allow, by contrast to the passive rotational speed sensors, a reliable detection even of very low rotational speeds and speeds and the direction of rotation of the wheels 12 of the nondriven front axle 10, which can have an advantageous effect on the detection of starting. In particular, they can determine the difference between the rotational speed zero and a very low rotational speed of the wheels 12 on the front axle 10, which results in an improvement in the starting detection. However, the principle also functions with passive sensors.

Furthermore, an active rotational speed sensor 72, which is connected to a transmission control unit 74 via the data line 46, can also be provided on the transmission output shaft 22 of the transmission 18. The transmission output shaft 22 is rotationally coupled to the rear wheels 14 in a manner not shown here, with the result that a rotation of the rear wheels 14 and the direction of rotation thereof can be detected by the active rotational speed sensor 72 and the signals are fed into the transmission control unit 74 as input signals.

As shown, the data lines 36 to 44 and 48 to 50 can be directly connected to the brake control unit 2 or else be connected to the brake control unit 2 by a data bus, for instance a CAN bus.

The rotational speed sensors 68 and 72 can be designed in such a way that they sense teeth of gearwheels (not shown here) on the transmission output shaft 22 or on drive shafts of the front axle 10. Alternatively, the transmission output shaft 22 and the drive shafts can also have provided thereon additional pole rings with toothing which are then sensed by the rotational speed sensors 68 and 72.

The transmission 18 is preferably an automated transmission with the transmission control unit 74. The clutch 20 is here electrically actuated, for example, by the transmission control unit 74. The transmission control unit 74 and brake control unit 2 are both connected to a CAN bus 76. Consequently, the data of the active rotational speed sensor 72 which measures the rotational speed of the transmission output shaft 22 are here distributed via the transmission control unit 74 and the CAN bus 76 and are thus also available to the brake control unit 2. Furthermore, a signal which delivers information on the position of a selector lever (not shown here) of the automated transmission—Neutral, Drive, Reverse or Park—is also available to the brake control unit 2 via the data bus 76.

According to an embodiment not shown here, the transmission 18 could also be a nonautomated manual shift transmission. In this case, the brake control unit 2 receives a signal which delivers information on the position of a gear lever of the transmission—Neutral, Gear stage, Reverse gear—via a corresponding sensor and by means of a data line.

Furthermore, an engine control unit 78 which controls the engine 16 is also connected to the data bus 76. An electric gas pedal 80 which has at least one sensor for measuring the gas pedal position and/or the actuation speed of the gas pedal 80 feeds a drive request signal corresponding to the degree of actuation of the gas pedal 80 into the engine control unit 78. Since the engine control unit 78 is also connected to the data bus 76, a signal which delivers information on an actuation or nonactuation of the gas pedal 80 and in particular also on its degree of actuation is also available to the brake control unit 2 via the data bus 76.

The electric clutch 20 is controlled by an electrical signal of the transmission control unit 74 which, by being fed via the data bus 76 also into the brake control unit 2, then provides the latter with information on the state of the clutch 20—engaged or disengaged. Furthermore, a sensor is also present on the gas pedal 56 through the electrical channel 62 of the brake value transmitter 54, which sensor feeds the actuating state of the gas pedal 56—unactuated, generally actuated or degree of actuation—into the brake control unit 2 via the data line 50. Last but not least, a nonactuated parking brake which the vehicle here also preferably has can also represent a signal for an intended driving away of the vehicle from the stationary state. The actuation or nonactuation of an operating member of the parking brake can be determined by a corresponding electrical signal, especially if the parking brake is electrically controlled.

An intended driving away of the vehicle 1 from the stationary state can then be signaled to the brake control unit 2 via signals from at least one of the sensors 22, 62 and 80 present here. If, for example, it is determined by the electronic brake control unit 2 that the instantaneous rotational speed of the transmission output shaft 22 of the transmission 18 which is measured by the active rotational speed sensor 72 is greater than a rotational speed which corresponds to the idle speed or to an idle rotational speed band of the engine 16 which contains a tolerance, this indicates an intended driving away of the vehicle 1 from the stationary state.

Furthermore, for example, an actuated gas pedal 80, a selector lever in the driving position (Drive or Reverse) of the here preferably automated transmission 18, an unactuated brake pedal 56 and a clutch 20 in the engaged state indicate an intended driving away of the vehicle 1 from the stationary state.

Therefore, a detection of an intended driving away of the vehicle 1 from the stationary state preferably occurs here automatically by means of at least one of the stated sensors 62, 72 and 80. The sensor signals of this at least one sensor 62, 72 and 80 are then compared with reference values in the brake control unit 2 in order to be able to identify an intended driving away.

Alternatively or in addition, an additional actuating member 82 which can be actuated separately by the driver and which is likewise connected to the brake control unit 2 via a data line 84 can also be present.

The additional actuating member 82 which can be actuated separately by the driver is provided and designed in such a way that, independently of the further actuating members which can be actuated by the driver, such as brake pedal 56 or gas pedal 80, it can generate signals which represent an intended driving away of the vehicle 1 from the stationary state and are fed as input signals into the electronic brake control unit 2. The additional actuating member 82 which can be actuated separately by the driver can here include, for example, a changeover switch which is integrated into a current circuit and is actuated by a lever, wherein the driver can pivot the lever into an "on" position and into an "off" position. In the "on" position, a signal representing an intended driving away of the vehicle 1 from the stationary state is then fed into the brake control unit 2, and in the "off" position, the generation of this signal is prevented.

The driver can, for example, move the lever of the actuating member 82 from the "off" position into the "on" position if he or she has determined that a driving away from the stationary state on slippery ground is not possible without excessive traction slip, that is to say if the wheels 14 of the driven rear axle 6 spin upon starting.

The above-described components and subassemblies designed in a preferred manner make it possible to realize a starter aid for the vehicle 1 if the wheels 14 of the driven rear axle 6 spin on slippery ground and an excessive traction slip is to be avoided.

The electronic brake control unit 2 is then designed in such a way that it at least temporarily feeds brake application signals into the pressure-regulating module 66 of the driven rear axle 6 if the rotational speed signals of the rotational speed sensors 68 on the front axle 10 correspond to a rotational speed equal to zero and at the same time the signals of at least one sensor from the group consisting of the active rotational speed sensor 72 on the transmission output shaft 22 and/or of the electrical channel 62 of the brake value transmitter 54 and/or of the sensor of the gas pedal 80 indicate an intended driving away of the vehicle 1 from the stationary state. The intended driving away of the vehicle 1 from the stationary state is then automatically detected. Here, however, the signals of the wheel rotational speed sensors 70 on the wheels 14 of the rear axle 6 are preferably not taken into consideration because their speed resolution at low speeds is too low.

Alternatively or in addition, the signal which is generated by the driver when placing the additional actuating member 82 into the "on" position and is fed into the brake control unit 2 can also represent the intended driving away of the vehicle 1 from the stationary state.

If therefore the rotational speed sensors 68 on the front axle 10 detect a rotational speed equal to zero, this indicates that the vehicle is still at a standstill although the signals of the further sensors 22, 62 and 80 already signal an intended driving away of the vehicle 1 from the stationary state, for example through an actuated gas pedal 80 and/or through an unactuated brake pedal 56 and/or through a rotational speed of the rotating transmission output shaft 22 that is higher than the idle rotational speed. It is therefore to be assumed in this case that the wheels 14 of the rear axle 6 spin on the ground and an excessive traction slip is present.

The brake control unit 2 then therefore generates brake application signals exclusively for the pressure-regulating module 66 of the driven rear axle 6 in order to generate a brake torque on the rear axle 6 that acts against the drive torque which is too high because it leads to the spinning of the wheels 14.

In addition, the driver also recognizes the need for the starter aid by virtue of the fact that, in spite of the selector lever of the transmission 18 in the "Drive" position, unactuated brake pedal 56 and actuated gas pedal 80, the vehicle 1 does not move and the wheels 14 on the rear axle 6 spin. The driver can then optionally actuate the actuating member 82 into the "on" position, with the result that an input signal is fed into the electronic brake control unit 2, whereupon the latter generates a braking force on the wheel brakes 4 of the rear axle 6.

The starter aid thus consists in a generation of braking force/brake torque on the driven rear axle 6 in order to counteract the spinning of the wheels 14. In general, an automatic activation of the starter aid by means of the above-described sensor system 22, 56, 68 and 80 on the one hand and an activation of the starter aid by the driver by means of the actuating member 82 are possible alternatively or in a mutually complementary manner.

Here, the ASR, ABS and ESP functionalities implemented in the electronic brake control unit 2 allow a slow increase of the braking forces, here in electropneumatic brakes of the braking pressure in the wheel brakes 4, for example pneumatic wheel brake cylinders of the driven rear axle 6, first to the application pressure (for example 0.3 bar), and then a slow, ramplike increase (for example 0.2 bar/s) up to a predetermined value. Also conceivable, however, is an abrupt increase from zero to a parameterized value of the braking pressure.

The invention is not limited to electropneumatic brake systems, but it can also be realized in all electrically controllable braking systems, such as, for example, purely electrically operating brake systems or else in electrohydraulic brake systems.

Alternatively or in addition to the braking engagement, the drive torque of the engine 16 can also be reduced if the need for the starter aid is automatically recognized and then activated and/or the starter aid is triggered via the actuator member 82. The brake control unit 2 then (also) controls the engine control unit 78 in order to reduce the drive torque when spinning of the wheels 14 of the driven rear axle 6 is detected automatically or by the driver.

If then after some time the rotational speed signals of the rotational speed sensors 68 on the front axle 10 communicate a rotational speed which is unequal to zero to the brake control unit 2, which signals that traction is then present and the vehicle moves in the desired direction, the brake control unit 2 then no longer feeds brake application signals into the pressure-regulating module 66 of the driven rear axle 6, with the result that the wheel brakes 4 release there. Alternatively or in addition to this, the driver, after having recognized the presence of traction on the rear axle 6, can also move the actuating member 82 from the "on" position into the "off" position again, with the result that the starter aid is also deactivated by the brake control unit 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS 1 vehicle
2 brake control unit
4 rear-axle wheel brakes
6 rear axle
8 front-axle wheel brakes
10 front axle
12 front wheels
14 rear wheels
16 engine
18 transmission
20 clutch
22 transmission output shaft
24 pneumatic line
26 pneumatic line
28 pneumatic line
30 pneumatic line
32 pneumatic line
34 pneumatic line
36 data line
40 data line
42 data line
44 data line
46 data line
48 data line
50 data line
54 brake value transmitter
46 brake pedal
58 front-axle pneumatic channel
60 rear-axle pneumatic channel
62 electrical channel
64 front-axle pressure-regulating module
66 rear-axle pressure-regulating module
68 front-axle wheel rotational speed sensors
70 rear-axle wheel rotational speed sensors
72 rotational speed sensor
74 transmission control unit
76 CAN data bus
78 engine control unit
80 gas pedal
82 actuating member
84 data line

What is claimed is:

1. A vehicle, comprising:
at least one driven axle;
at least one nondriven axle;
wheel brake actuators provided on the at least one driven axle and on the at least one nondriven axle;
an electrically controllable brake system which includes at least one electronic brake control unit configured to feed brake application signals to the wheel brake actuators;
a wheel rotational speed sensor on at least one wheel of the at least one nondriven axle, the wheel rotational speed sensor being configured to generate wheel rotational speed signals; and
a signal generator configured to generate signals which differ from the wheel rotational speed signals and which represent an intended driving away of the vehicle from the stationary state,
wherein
at least one of the wheel rotational speed signals and the signal generator signals are input signals to the electronic brake control unit, and
the at least one electronic brake control unit is configured to
generate brake application signals for at least partial application of the wheel brake actuators on the at least one driven axle in dependence on the input signals,
feed the brake application signals into the wheel brake actuators of the at least one driven axle if the rotational speed signals of the rotational speed sensor correspond to a rotational speed of zero and at the same time the signals of the signal-generator correspond to an intended driving away of the vehicle from the stationary state, and
not feed brake application signals into the wheel brake actuators of the at least one driven axle if the rotational speed signals of the at least one rotational speed sensor correspond to a rotational speed that is not zero.

2. The vehicle as claimed in claim 1, wherein
the signals of the signal-generator are dependent on a rotational speed of a transmission output shaft of a transmission of the vehicle.

3. The vehicle as claimed in claim 2, wherein
the signal-generator includes at least one active rotational speed sensor configured to measure the rotational speed of the transmission output shaft of the transmission and feed the transmission shaft rotational speed to the electronic brake control unit.

4. The vehicle as claimed in claim 1, wherein
the signal-generator signals are generated by an actuation of at least one of a hand-actuable actuating member and a foot-actuable actuating member operable by a driver of the vehicle.

5. The vehicle as claimed in claim 4, wherein
the signals of the signal-generator are dependent on at least one of an engaged or disengaged state of a clutch of the vehicle, a selected transmission gear stage, a selected transmission mode of the transmission, an actuation or nonactuation of a brake pedal, an actuation or nonactuation of a gas pedal, and an actuation or nonactuation of an actuating member of the parking brake.

6. The vehicle as claimed in claim 5, wherein
the signal-generator includes an additional actuating member configured to be actuated separately by the driver, and
the additional actuating member is configured to generate, independently of an actuation of the clutch, the transmission, the brake pedal, the gas pedal, and the parking brake of the vehicle, the signals which differ from wheel rotational speed signals generated by a wheel rotational speed sensor which represent an intended driving away of the vehicle from the stationary state.

7. The vehicle as claimed in claim 1, wherein
the brake application signals provided to the wheel brake actuators of the at least one driven axle cause the wheel brake actuators of the at least one driven axle to apply at least a temporarily acting brake torque on the wheels of the at least one driven axle.

8. The vehicle as claimed in claim 7, wherein
the at least temporarily acting brake torque on the wheels of the at least one driven axle increases in ramp form from zero up to a predetermined value, immediately increases to the predetermined value, or acts over one or more predetermined time intervals.

9. The vehicle as claimed in claim 1, wherein
the electrically controllable brake system is at least one of a service brake system and a parking brake system.

10. The vehicle as claimed in claim 1, wherein
the electronic brake control unit is configured to control a function of one or more of a brake slip control (ABS), an electronic parking brake (EPB), a traction slip control (ASR), and an electronic stability program (ESP).

11. The vehicle as claimed in claim 1, wherein
the electrically controllable brake system is an electronically controlled electropneumatic brake system.

* * * * *